(12) United States Patent
Nemeth-Csoka

(10) Patent No.: US 11,283,383 B2
(45) Date of Patent: Mar. 22, 2022

(54) ENERGY-EFFICIENT ASYNCHRONOUS MACHINE

(71) Applicant: Siemens Aktiengesellschaft, Munich (DE)

(72) Inventor: Mihaly Nemeth-Csoka, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 26 days.

(21) Appl. No.: 16/649,646

(22) PCT Filed: Sep. 20, 2018

(86) PCT No.: PCT/EP2018/075508
§ 371 (c)(1),
(2) Date: Mar. 21, 2020

(87) PCT Pub. No.: WO2019/063419
PCT Pub. Date: Apr. 4, 2019

(65) Prior Publication Data
US 2020/0259435 A1  Aug. 13, 2020

(30) Foreign Application Priority Data

Sep. 29, 2017 (EP) ..................................... 17194133

(51) Int. Cl.
*H02P 21/02* (2006.01)
(52) U.S. Cl.
CPC .................................. *H02P 21/02* (2013.01)
(58) Field of Classification Search
CPC .......... G01K 17/00; G01K 7/346; G01P 5/10;
G01P 13/006; H02P 21/00; H02P 21/02;
H02P 21/06; H02P 21/08; H02P 21/10;
H02P 21/13; H02P 21/14; H02P 21/141;
H02P 21/20; H02P 21/22; H02P 21/24;
H02P 21/26; H02P 21/28; H02P 23/0004;
(Continued)

(56) References Cited

U.S. PATENT DOCUMENTS 5,719,482 A  2/1998 Kunzel
7,960,928 B2 *  6/2011 Tang ................... B60L 15/2045
                                             318/400.09
(Continued)

FOREIGN PATENT DOCUMENTS

DE  19524654 A1  1/1997
DE  4138066 B4   6/2006
(Continued)

OTHER PUBLICATIONS

PCT International Search Report and Written Opinion of International Searching Authority dated Jan. 17, 2019 corresponding to PCT International Application No. PCT/EP2018/075508 filed Sep. 20, 2018.

*Primary Examiner* — Antony M Paul
(74) *Attorney, Agent, or Firm* — Henry M. Feiereisen LLC

(57) ABSTRACT

In a method for determining a flux of an asynchronous machine, the flux is adjusted according to a loss of the asynchronous machine. Therefore, an apparatus for determining the flux of the asynchronous machine is provided with a model for calculating a loss of the asynchronous machine according to the flux of the asynchronous machine. A selection facility selects a flux according to the loss.

10 Claims, 6 Drawing Sheets

(58) Field of Classification Search
CPC ...... H02P 23/0022; H02P 27/00; H02P 27/04; H02P 27/06; H02P 25/062; H02P 29/64; H02P 1/42; H02P 21/0089; H02P 23/07; H02P 29/00; H02P 29/60; H02P 29/66; H02P 29/67

See application file for complete search history.

(56) References Cited

U.S. PATENT DOCUMENTS

| | | | | |
|---|---|---|---|---|
| 8,975,858 | B2 * | 3/2015 | Stichweh | H02P 21/50 318/806 |
| 9,667,187 | B2 * | 5/2017 | Yoshimoto | H02P 23/02 |
| 9,847,745 | B1 | 12/2017 | Fink | |

FOREIGN PATENT DOCUMENTS

| | | | |
|---|---|---|---|
| DE | 102013209347 A1 | 11/2014 | |
| DE | 102014213985 A1 | 1/2016 | |
| EP | 0019138 B1 | 11/1988 | |
| EP | 0771067 B1 | 1/1998 | |
| EP | 2131488 A1 * | 12/2009 | ............. H02P 21/12 |
| EP | 2131488 A1 | 12/2009 | |
| EP | 2811644 A1 | 12/2014 | |
| WO | WO 2005018086 A1 | 2/2005 | |

* cited by examiner

ENERGY-EFFICIENT ASYNCHRONOUS MACHINE

CROSS-REFERENCES TO RELATED APPLICATIONS

This application is the U.S. National Stage of International Application No. PCT/EP2018/075508, filed Sep. 20, 2018, which designated the United States and has been published as International Publication No. WO 2019/063419 A1 and which claims the priority of European Patent Application, Serial No. 17194133.9, filed Sep. 29, 2017, pursuant to 35 U.S.C. 119(a)-(d).

BACKGROUND OF THE INVENTION

The invention relates to an asynchronous machine. Asynchronous machines can be operated at one operating point or at different operating points. Different control or regulating devices can be provided for this purpose.

A wide variety of concepts are known for controlling and/or regulating the asynchronous machine.

EP 0 019 138 B1 discloses a method for regulating an inverter-fed asynchronous machine. Without detecting the rotor speed, a current control parameter corresponding to a desired active current is formed from the regulating deviation between a specified desired speed value and a substitute actual value. The amplitude of the inverter output current is regulated in accordance with the amplitude of a desired stator current formed from the desired active current and a desired magnetization current corresponding to the specified flux. The actual values of the active current and the flux value are calculated from actual values of stator current and stator voltage and therefrom a load state variable is formed as the quotient, and this corresponds in stationary operation to the tangent of the load angle. The frequency of the inverter output current is controlled with a frequency control variable, which is formed from the regulating deviation of the actual value and a desired value of the load state variable formed from the current control variable. The frequency control variable is used as the substitute actual value.

A method for controlled impression of a stator current desired value and a torque desired value for an inverter-fed induction machine is known from WO 2005/018086 A1, wherein, as a function of a predetermined rotor flux desired value and a determined rotor flux actual value, a field-forming current component of the stator current desired value is calculated and, as a function of a predetermined torque desired value, of the determined rotor flux actual value and a determined torque-forming current component of a measured stator current, a torque-forming current component of the stator current desired value is calculated, wherein, as a function of a determined rotor slip frequency and an angular frequency, a stator angular frequency actual value is determined, wherein from these calculated values, as a function of the parameters frequency-dependent leakage inductance and stator resistance, as the manipulated variable the integral of the stator voltage is calculated from which a flux path curve selected from stored offline optimized flux path curves is derived.

A further field-oriented regulation is also known from DE 41 38 066 B4. The structure of the field-oriented regulation is crucial for the accuracy of the active current actual value and of the flux ψ and therefore also for the accuracy of the adaption method. A rotor temperature model can be used to improve the accuracy.

A method for sensorless field-oriented regulation of an asynchronous machine is known from DE 195 24 654 A1. Here, a machine model is used to form estimates for example for the stator resistance.

Use of a further temperature model for a rotor resistance is known from EP 0 771 067 B1.

There is an increasing demand for asynchronous machines to operate in an energy-efficient manner. An object of the invention is to improve the regulation and/or control of an asynchronous machine. As a result, it is possible to operate the asynchronous machine more efficiently.

SUMMARY OF THE INVENTION

One solution to the object results according to a method for determining a flux of an asynchronous machine as claimed in claim 1 or according to a device for determining a flux of an asynchronous machine as claimed in claim 10. This also produces a solution to the object by way of a method for regulation of an asynchronous machine in which the method for determining the flux of the asynchronous machine is used. This method serves in particular to minimize the loss of the asynchronous machine and/or the optimization of the efficiency of the asynchronous machine.

Asynchronous machines can be operated in the voltage setting range with the rated flux of the asynchronous machine, A specified load state (fixed torque and fixed speed) can also be achieved with a different flux value, however. The flux value can be freely selected in a range from approximately 50% to 120% (depending on load state), This degree of freedom can be used for optimizations, for example for efficiency optimization.

In one method for determining a flux of an asynchronous machine, the flux is set as a function of a loss of the asynchronous machine. Therefore, the efficiency of the asynchronous machine can be improved/optimized (loss optimization) by a reduction/minimization of the loss of the asynchronous machine.

In one embodiment of the method, a non-linear saturation characteristic curve is used. The loss can be calculated more accurately by means of the non-linear saturation characteristic curve.

In an asynchronous machine there are various regions, which can be relevant to the loss. These regions are, for example, ohmic losses in the stator, ohmic losses in the rotor, iron losses, mechanical losses, etc.

The mechanical losses include friction losses such as losses in a bearing, Ventilation losses, which can occur with cooling, also contribute to the total losses. In self-ventilated machines the power requirement changes in proportion to the speed cubed, Current losses, which occur due to air vortices between stator and rotor, can also be taken into account but, as a rule, are small and thereby optionally also negligible.

When determining the power loss, a distinction can be made between a direct and an indirect determination of the power loss. The types of loss are detected by targeted measurements with direct determination. Input and output powers are defined with an indirect measurement. The power loss is defined as the difference. Since this formation of differences is two substantially equal variables, the individual powers $P_{in}$ and $P_{out}$ can be determined quite accurately in order to obtain the power loss $P_V$ with a sufficient level of accuracy: $P_V = P_{in} - P_{out}$. Although the mechanical losses are sometimes very relevant, they are not important in energy optimization by way of the inverter because an operating point defined by speed and torque does not permit sufficient scope. The reduction in this type of loss is possible by structural measures, for example forced ventilation.

All types of loss, which are not individually considered, are described as "additional losses", as defined, for example, in DIN EN 60034-2-1.

In one embodiment of the method, the loss is determined by means of a model. The model takes into account, in particular, losses in the motor, in other words in the electric machine. These are, in particular, ohmic losses, ohmic losses in the stator of the electric machine and/or ohmic losses in the rotor of the electric machine. Iron losses are also losses in the electric machine, which can be taken into account in the model. Since the rotor frequency is relatively low in the stationary state, the fundamental oscillation iron losses in the rotor can be practically ignored compared to those in the stator. During inverter operation, owing to the significant harmonic content (current, voltage), the iron losses are higher than during grid operation. In an equivalent circuit diagram for the electric machine, for example the iron loss can be taken into account by way of a resistance parallel to the magnetizing inductance. The model can also take account of hysteresis losses. The hysteresis losses can dominate the iron losses in the voltage setting range, They are produced as follows:

$$P_k = k_k * f * \psi^2.$$

The model can also take account of eddy current losses. The eddy current losses can dominate the iron losses in the field weakening range. They are produced as follows:

$$P_w = k_w * f^2 * \psi^2.$$

In one embodiment of the method, the model takes into account a non-linear saturation characteristic curve. This characteristic curve can be stored directly in the model.

In one embodiment of the method, the loss is determined by means of a model, wherein in order to reduce (minimize) the loss the flux is either reduced below 100%, or is increased to above 100%.

Asynchronous machines can be operated in the voltage setting range with the rated flux of the asynchronous machine at 100% flux. A specified load state (fixed torque and fixed speed) can also be achieved with a different flux value, however. The flux value can be selected, for example, in a range from approximately 50% to 120% (depending on load state). The loss of the asynchronous machine is affected by the selected flux, Depending on the operating state of the asynchronous machine, an increase in the flux above 100% of the rated flux can lead to a reduction in the loss.

In one embodiment of the method, a new flux to be set for a minimal loss is achieved by an iterative approach to the minimal loss by iterative setting of the flux. In one embodiment of the method, a flux is determined at which the loss is minimal and this determined flux is set in one step.

In one embodiment of the method, the model of the electric machine has a thermal model. At least some of the losses in the asynchronous machine can be calculated with the thermal motor model. The thermal model can also be used for motor protection and a resistance adaption. Calculation of the thermal model is used in one embodiment (also) for efficiency optimization.

In one embodiment of the method, the ohmic losses are taken into account. The ohmic losses are proportional to the square of the current and are linearly dependent on the resistance of the conductor. This resistance value is temperature-dependent and this dependence cannot usually be ignored:

$$R_\theta = R_{20°C} * (1 + \alpha * \Delta T)$$

where the factor $\alpha$ is material-dependent.

With copper, the value is $$0.0039 \frac{1}{K},$$

with aluminum, $$0.004 \frac{1}{K}.$$

The rule of thumb applies that with a 100 K temperature increase, approximately a 40% increase in resistance should be expected. With the fundamental oscillation frequencies in the stationary state, the current displacement frequently does not play an important part. In the case of inverter operation, the harmonic components in the currents and the ohmic losses caused thereby, owing to the reduced penetration depth, can no longer be ignored, however. The equivalent resistances for the $n^{th}$ harmonic $R_n$ can be modeled for example as follows, where n is the harmonic number of the corresponding harmonic and f the frequency of the harmonic (based on the rated frequency):

$$R_n = R_{s,DC} * (1 + k_n * f_n^{0.5})$$

The parameters $k_n$ can be obtained using the finite element method. The ohmic losses in the stator are calculated as follows:

$$P_{s,Cu} = 3 * R_s * I_s^2.$$

On measuring $R_s$ (stator resistance) it should be noted that the cable resistance potentially also measured at the same time should be taken into account in the regulation but does not change in such a temperature-dependent manner as the resistance of the stator winding. In the case of the ohmic losses in the stator, it should be noted that both the longitudinal component $i_d$ of the current as well as the corresponding transverse component $i_q$ contribute slightly thereto, Ohmic losses in the rotor can be calculated according to the following equation $$P_{r,Cu} = 3 * R_r * I_r^2$$

The changes in resistance caused by current displacement can potentially not be ignored in the case of rotor frequencies occurring under transient states.

In one embodiment of the method, the flux (magnetic flux of the electric machine) with a minimal loss is set. The flux is therefore selected such that the loss is minimal. For this, a model of the electric machine is used with which calculation of the loss is possible. This relates, in particular, to only some of the total loss of the electric machine.

In one embodiment of the method, a longitudinal current $I_d$ of the electric machine is set to be different from a transverse current $I_q$ of the electric machine. This stems from the recognition that with a condition $I_q = I_d$, as a rule, the optimum operating point of the electric machine still cannot be achieved.

In one embodiment of the method, the efficiency of the electric machine is optimized. For optimization, a loss, for example an ohmic loss, which is dependent on the temperature, of the electric machine is calculated in a model by means of a model. The calculated loss changes as a function of the flux selected in the model. The flux which produced the lowest loss in the model is set at the electric machine.

In one embodiment of the method, the current value at the set flux differs from the minimal current value. If such a situation results it becomes clear that optimum efficient operation of the electric machine can also be achieved if a flux is selected at which the current value is not minimal.

In one embodiment of the method, the flux can be set independently of load and/or dependent on load. In one embodiment of the method, the current power loss is calculated from a specified load state (given by torque and/or speed) and the known flux value. The power loss is then calculated for the same load state at an assumed slightly (for example approximately 5%) smaller and a greater flux value. The differences between the flow values, which are used for calculation of the power loss, can also move a band of 1% and 10%, or be selected therefrom. The percentage can also be selected as a function of the operating state of the electric machine. A minimal power loss is calculated from the three loss values (in the case of a smaller flux, a current flux, a greater flux) in particular by parabolic approximation. The flux pertaining to the minimal power loss is set as the optimum flux. The method can have further iteration steps.

In one embodiment of the method, a change in the loss is calculated as a function of a change in the flux, wherein the flux is set as a function of the calculated loss. This can be implemented as a fast and stable method. The flux is set in particular such that the efficiency attains the meteorologically maximum achievable value. The method can be carried out without an iteration. Owing to direct calculation (without iteration), the method is faster and more reliable than an iterative method. Consideration of the iron loss (which can make up 15 to 25% of the nominal loss after all and is completely ignored in a method which takes account of the condition $I_d=I_q$) enables improved, in particular maximum, efficiency optimization.

According to the described embodiments, the method is in particular direct, fast and reliable. In particular, no new motor parameters are required; the known and existing parameters are sufficient. A motor database which may already have existed previously does not have to be expanded. The described method for determining the flux of the electric machine requires little computing time for the optimization thereof and is in expensive to implement.

In one embodiment of the method, the loss is calculated in the case of a current flux during operation of the asynchronous machine, in the case of a flux reduced in relation thereto and in the case of a flux increased, likewise in relation thereto, wherein the minimum of a curve is determined by means of the calculated losses, wherein the flux with a minimal loss is set. A current loss is therefore calculated in the case of a current flux during operation of the asynchronous machine by means of the model (in relation to/for the asynchronous machine). Furthermore, a loss, which would be set if the flux were to be reduced, is calculated by means of the model. Furthermore, a loss, which would be set if the flux were to be increased, is calculated by means of the model. The reduction or decrease affects an assumed change in relation to the current flux. The losses are calculated in relation to the current flux, the assumed reduced flux and the assumed increased flux. From these values relating to the losses a function may be formed, in particular a polygon function or a parabolic function. A minimum can be found for this formed function, which reflects the loss and depends on the flux, in other words a value at which the loss is minimized and/or is minimal. The value of the flux, at which the loss of the asynchronous machine is minimized and/or minimal, can then be set or approached, Therefore, it is possible to set the flux in one step. An iterative process for setting the best flux is thereby no longer necessary. The assumed changes in relation to the current flux, in other words the values of the assumed increased flux and of the assumed reduced flux for calculating the loss or the loss function should be selected, in particular, such that they are sufficient for forming a parabolic function or a polygon function.

One solution to the object is also achieved by means of a device. The device for determining a flux of an asynchronous machine has a model for calculating a loss of the asynchronous machine as a function of the flux of the asynchronous machine and a selection facility for the selection of a flux as a function of the loss. The flux at which the loss is lowest by comparison should be selected.

In one embodiment of the device it has an activation facility for the device. Activation is therefore possible as a function of the load dynamics of the asynchronous machine.

In one embodiment of the device it is integrated in a rectifier. In this way motor data, which is stored in the rectifier, can also be used. Therefore, the computing power of the rectifier, which exists for the regulation of the electric machine, can also be used.

One of the described methods can be carded out by means of the device, or the device can be used in one of the methods.

In one embodiment saturations and iron losses are taken into account when calculating the desired value for the flux in the case of energy-optimized operation of the asynchronous machine.

BRIEF DESCRIPTION OF THE DRAWING

The invention will be explained further by way of example on the basis of exemplary embodiments and with reference to the accompanying drawings, wherein similar elements have the same reference numerals. In the drawings.

DETAILED DESCRIPTION OF PREFERRED EMBODIMENTS

Figure 1:
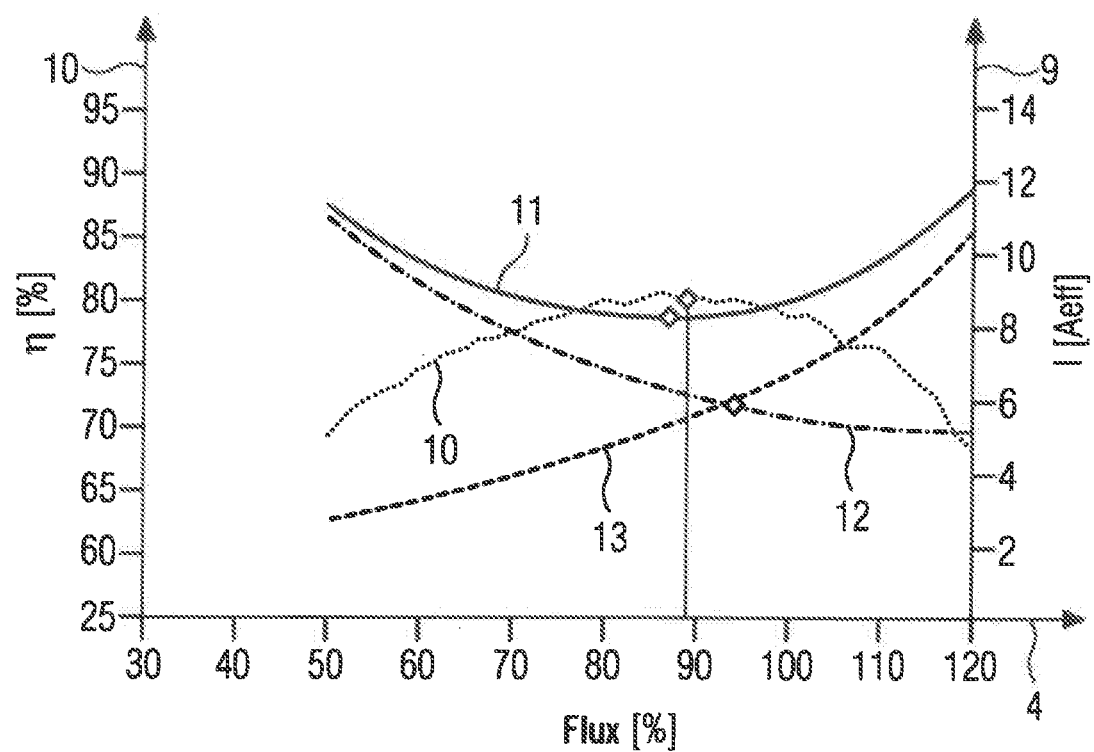
FIG. 1 shows a dependence of the efficiency of an asynchronous machine on a specification of the flux.

The illustration of FIG. 1 shows a graph which in an asynchronous machine shows by way of example the dependence of the efficiency η 10 on the flux ψ 4. In respect of an axis 9 for the current ($I[A_{eff}]$), a curve 11 for the current value I, a curve 12 for the transverse current desired value $I_{q\ desired}$ and a curve 13 for the desired value of the d-components of the current $I_{d\ desired}$ are also shown. At a value for the flux 4, which is greater than the value for the flux 4 at the maximum of the curve 10 for the efficiency, the intersection of the curve 12 with the curve 13 is approximately (η). At a value for the flux 4, which is smaller than the value for the flux 4 at the maximum of the curve 10 for the efficiency, the minimum of the curve 11 for the current value is approximately (η). This shows that a condition for setting the flux 4 in order to achieve the maximum efficiency (maximum of the curve 10) can still be improved and can be better than the conditions minimum of the current value 11 or intersection of the curves 12 and 13 ($I_{q\ desired}=I_{d\ desired}$).

Figure 2:
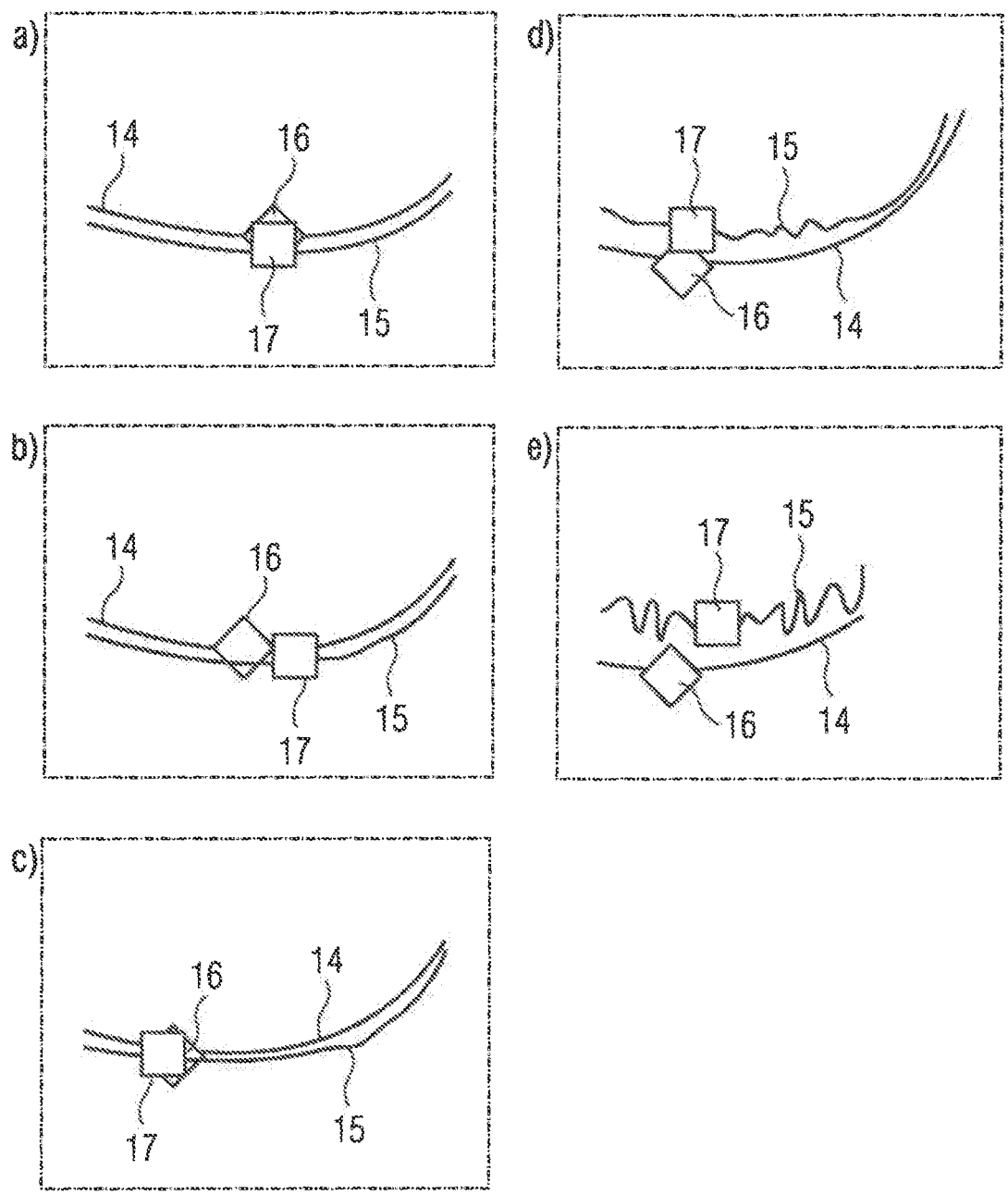
FIG. 2 shows examples of loss determination.

The illustration of FIG. 2 shows examples a) to e) for loss determination in the case of various stationary operating states of an asynchronous machine, A curve 14 with a calculated power loss, in particular the total loss, and a curve 15 with a difference comprising measured active power minus measured mechanical power are shown. The curve 14 has in each case a minimum 16, which is identified by a rhombus. The curve 15 has in each case a minimum 17, which is identified by a square. The dependence on the flux is shown in each case. It can be seen that the minimum of the curve 15 is always in the vicinity of the minimum of the curve 14. For optimization of the asynchronous machine a flux is therefore selected at which the calculated loss (the calculated power loss) is minimal.

The flux value defines the value for $I_{d\ desired}$ (i_sd) by way of the saturation characteristic curve. The value $I_{q\ desired}$ (i_sq) can be calculated from flux value and torque. The slip results from the rotor resistance, the transverse current and the flux value. The stator frequency also results thereby. All variables for a thermal motor model are known thereby and the motor losses can be unambiguously calculated. The following equations can result thereby:

| | |
|---|---|
| i_sq = k_t * Psi * m | transverse current |
| i_sd = f(Psi) | exciting current (saturation characteristic curve (measured on initial operation) |
| is^2 = i_sd^2 + i_sq^2 | stator current |
| f_r = * R_r * i_sq / Psi / 2 / pi | rotor frequency |
| f_s = Zp * n + f_r | stator frequency | where:

| | |
|---|---|
| flux value | Psi |
| speed | n |
| torque | m |
| torque factor | K_t |
| stator resistance (thermally adapted) | R_s |
| rotor resistance (thermally adapted) | R_r |
| number of pole pairs | Z_p |

Figure 3:
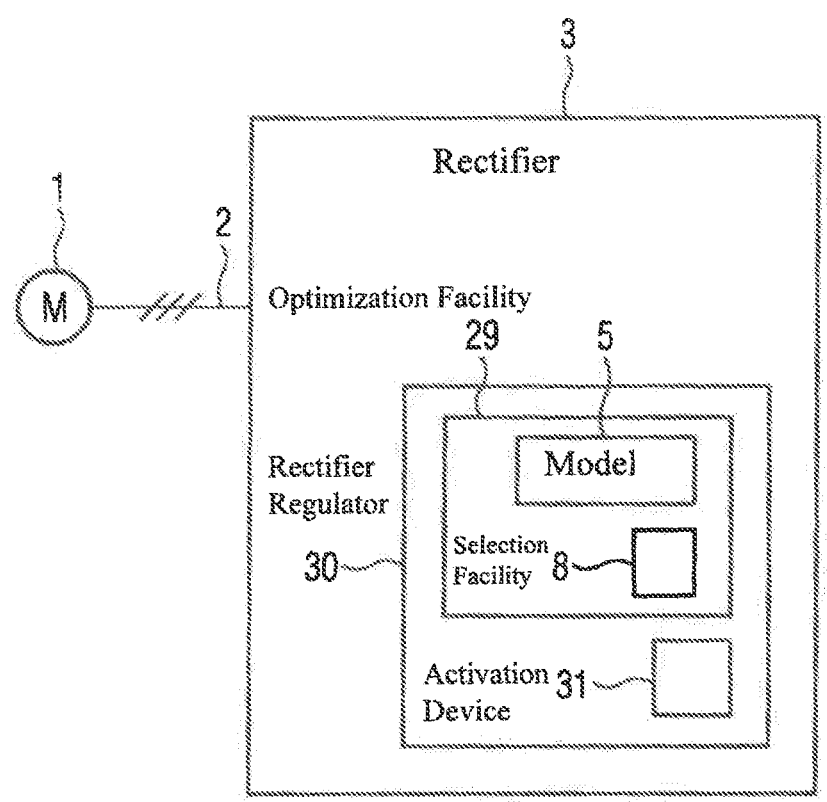
FIG. 3 shows an asynchronous machine with a rectifier.

The illustration of FIG. 3 shows an asynchronous machine 1, which is fed by a rectifier 3 via a power cable 2. The rectifier 3 has a rectifier regulator 30. A model 5 is integrated therein. This model 5 relates, for example, to a machine model (motor model) and/or a temperature model for the machine. Alternatively or in addition to the temperature model or instead of calculation of the motor losses, the temperatures of the individual motor masses (stator winding, rotor, laminated stator core) can be measured. The temperatures are a type of filtered loss. The colder a motor is at a specified operating state, the more energy-optimized it is. A type of temperature monitoring of the individual motor components with subordinate energy optimization is also conceivable.

The machine can then be optimized by way of an optimization facility 29 in which a selection facility 8 is integrated. For example, a type of optimization can be set and/or an optimum flux set (selected) using the selection facility 8. The optimization relates, in particular, to an optimization of the efficiency. For this, in particular from calculated values for machine losses at magnetic flux values selected so as to be different, a curve is located through these values and the value selected for the flux at which the mathematically generated curve has a minimum. An activation device 31 is provided in order to activate the optimization.

The optimum operating point of the asynchronous machine, or an operating point that comes close to it, is located where the losses calculated by the thermal motor model are smallest. Building on this fact, a search function can be implemented for the flux to be set. In a stationary state of the asynchronous machine, before a real change in the flux, in other words before a change in the desired value for the flux, it can be calculated whether a change in the flux value in an assumed direction (for example increase in the flux or reduction in the flux) would have a positive or negative effect on the efficiency. The flux desired value is then changed accordingly.

The calculation proceeds from the specified load state so that the speed and the torque are defined. Added to this is the assumed flux value. The flux value defines the I_sd by way of the saturation characteristic curve. The I_sq can be calculated from flux value and torque. The slip results from the rotor resistance, the transverse current and the flux value. The stator frequency also results thereby. All variables for the thermal motor model are known thereby and the motor losses can be unambiguously calculated.

The calculated optimum flux is contained for example between 50% and 120%. The calculated optimum flux can be taken into account, for example fully, not at all or in a smoothing manner, in the regulation of the rectifier for the asynchronous machine. Therefore, it is possible, for example, to alternate between a function for efficiency optimization and a loss optimization, with the respective optimization acting fully, not at all or partially, or there being a smooth transition between the optimization variants.

Figure 4:
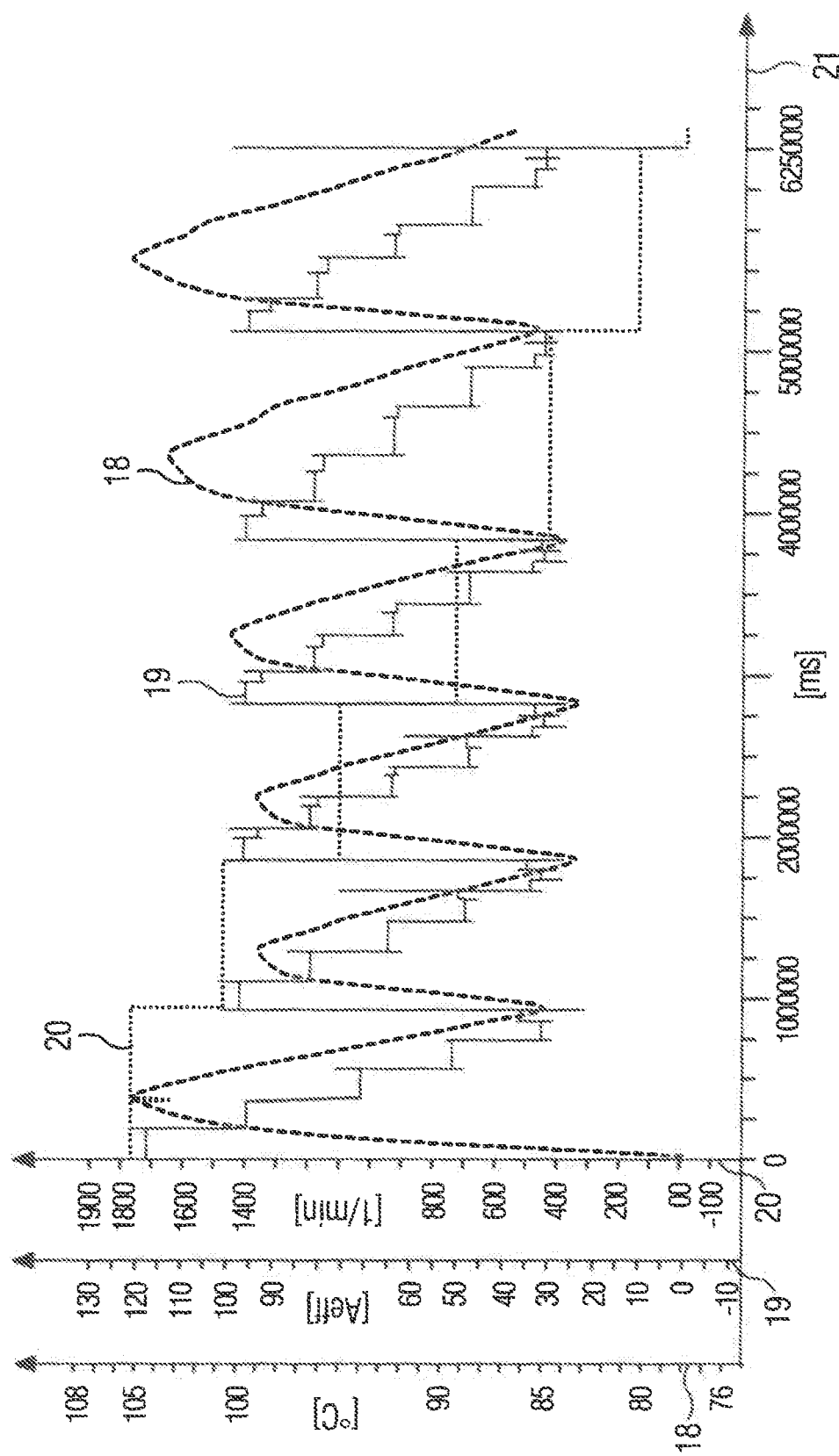
FIG. 4 shows measured values for speed, current and motor temperature.
Figure 5:
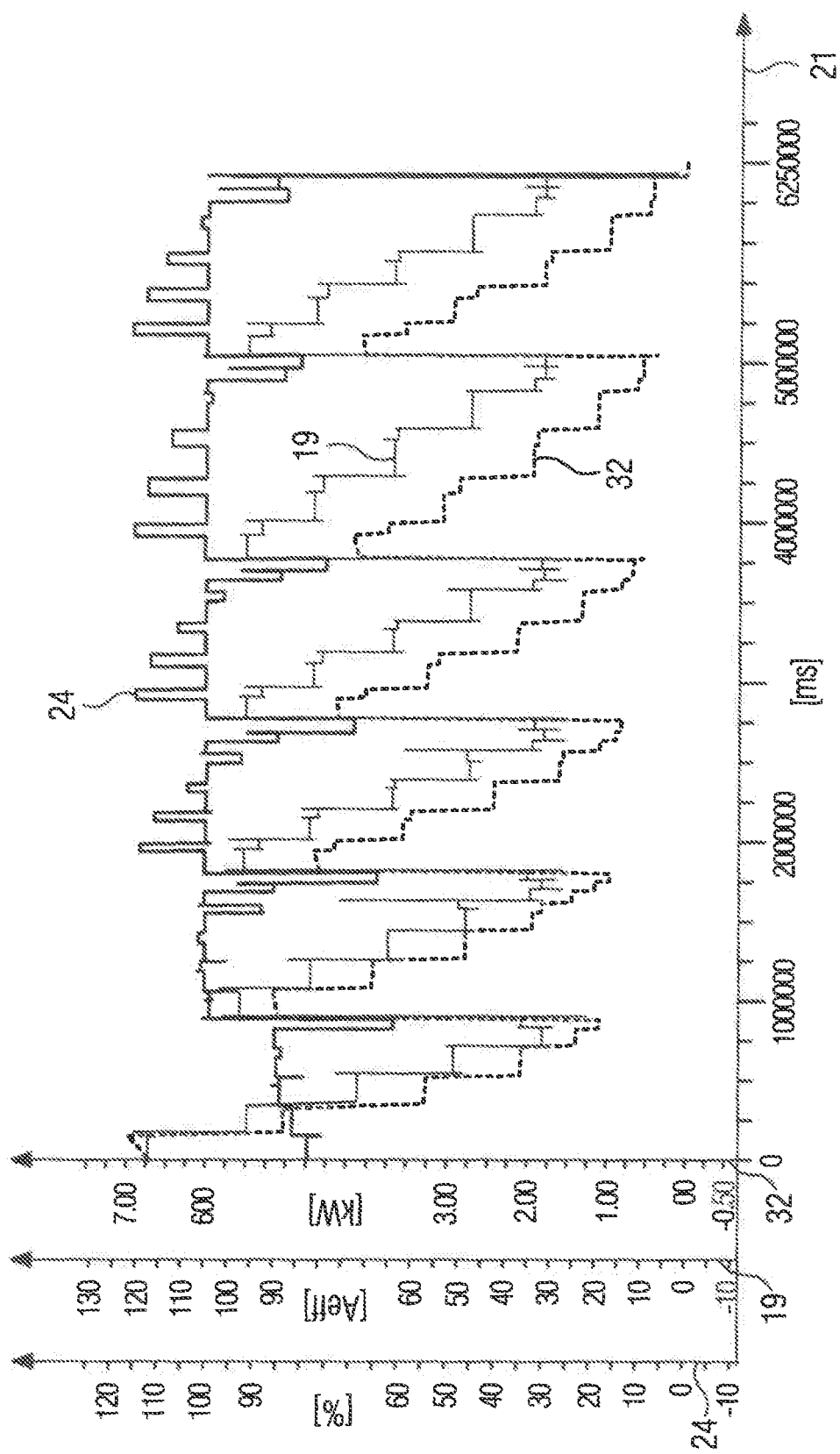
FIG. 5 shows measured values for the flux and a calculated power loss.
Figure 6:
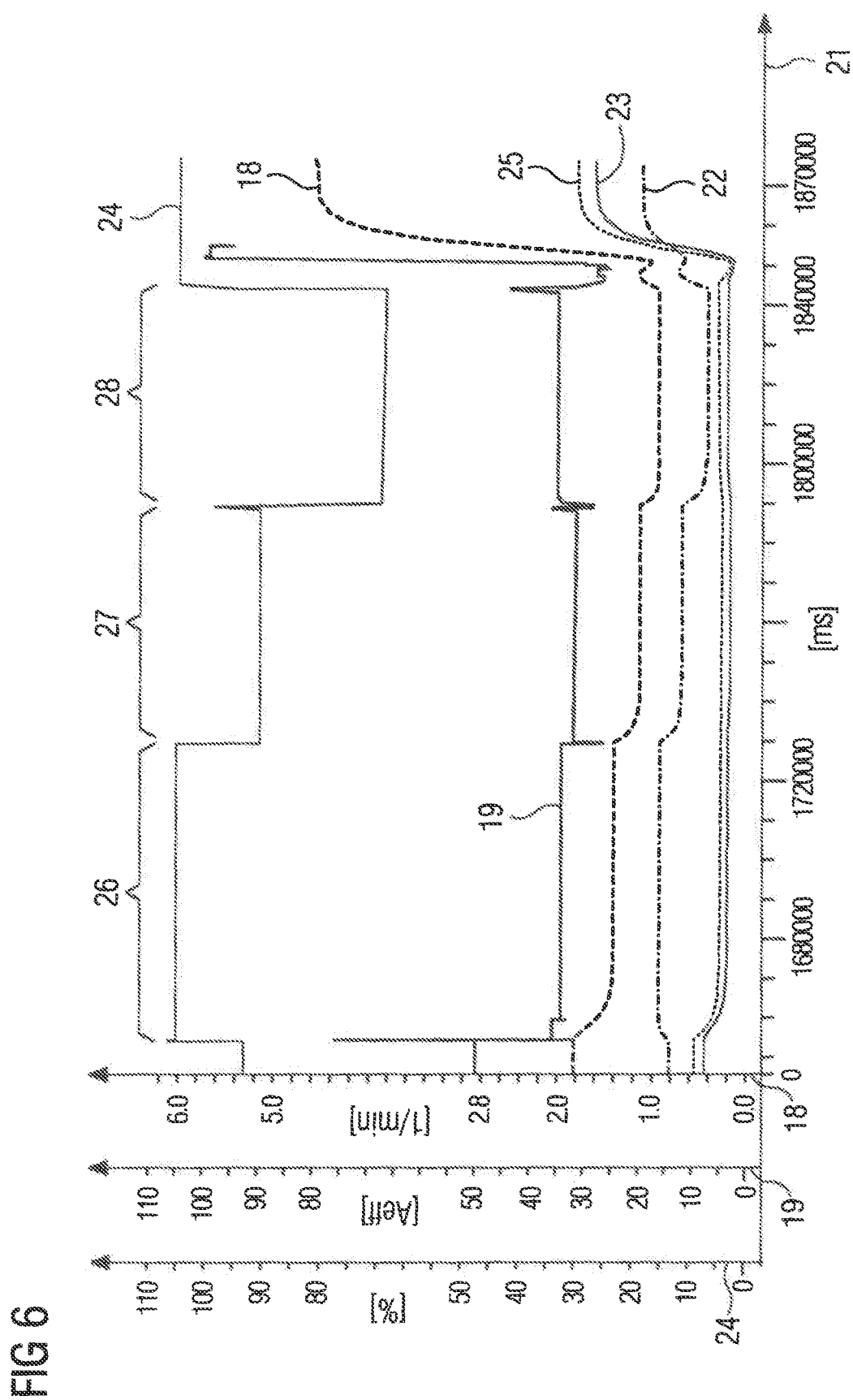
FIG. 6 shows a comparison of various optimizations of the asynchronous machine.

The illustrations of FIGS. 4, 5 and 6 show graphs for measured values in the case of an asynchronous machine. FIG. 4 shows measured values for speed, current and motor temperature. FIG. 5 shows measured values for the flux and a calculated power loss. FIG. 6 shows a comparison of various optimizations of the asynchronous machine.

Thirty load points (six different speeds, five different torques) were approached for recording of the measurements in FIGS. 4 and 5. Three measurements are carried out in all load points:
1. without flux optimization
2. with efficiency optimization (I_sd=I_sq)
3. with loss optimization (minimal loss is optimal).

The temperature of the stator winding was also recorded during the measurement.

In point 2 of the above list the asynchronous machine is optimized in a regulating mode (both servo as well as vector), for example such that the exciting current is set such that its value matches the torque-forming current ($I_d=I_q$ method). This method reduces the flux in particular hi the case of small loads. In the overload range it leaves the flux unchanged. The method $I_d=I_q$ only takes account of the ohmic losses, so that the optimum operating point cannot be achieved.

The illustration of FIG. 4 shows the motor temperature (stator winding temperature) 18, the speed actual value 20 (unsmoothed) and the value of the current actual value 19 (smoothed) over time 21. The following values from left to right were selected as speeds: n=120%, n=100%, n=75%, n=50%, n=30% and n=10%. If the flux value is not optimized (the first measurement in each case), the flux value reaches the expected value of 100% as long as there is no field weakening. The "efficiency optimization" (the second measurement in each case) is effective only due to flux reduction and only in the case of very small loads. In the example the method of loss optimization is nearly always effective: in the case of small loads with flux reduction, in the case of higher loads with flux increase. The total power loss is nearly always reduced in the process. If the asynchronous machine is operated in the range of the nominal point, the optimization potential is reduced if the machine is more or less correctly configured.

In the illustration of FIG. 5 the flux actual value 24 (set flux value) and the calculated total power loss 32 is plotted in addition to the current actual value 19 (smoothed) in the various methods:
1. without flux optimization
2. with efficiency optimization (I_sd=I_sq)
3. with loss optimization (minimal loss is optimal).

As can be seen, in the overload state there is an overmagnetization of the machine as long as the voltage limit is not effective. Furthermore, in certain operating states it can be seen that when the loss optimization is applied (point 3 from above) in the case of flux reduction, more current flows than with the other two methods (point 1 and 2 from above). The total losses are nevertheless reduced. As a result of the flux reduction the reduction in the iron losses is greater than the overall increase in the copper losses in the stator and rotor.

In the illustration of FIG. 6, a distinction is also again made between the three methods:
1. without flux optimization in a first phase 26
2. with efficiency optimization (I_sd=I_sq) in a second phase 27
3. with loss optimization (the minimal loss is optimal) in a third phase 28.

A calculated power loss for the stator 22, a calculated power loss for the stator winding 23, the flux actual value 24 and a calculated power loss for the rotor 25 are also shown.

It can be seen from the graphs in the figures that the efficiency, calculated from the measured variables, is different in the different load states and the different optimizations. Improvements can be achieved in particular at lower speeds or in the partial load range.

The invention claimed is:

1. A method for determining a flux of an asynchronous machine, said method comprising:
    setting the flux as a function of a loss of the asynchronous machine using a non-linear saturation characteristic curve;
    determining the loss with a model; and
    either reducing the flux below 100% or increasing the flux above 100%,
    wherein the model has a thermal model.

2. The method of claim 1, further comprising setting the flux with a minimal loss.

3. The method of claim 1, further comprising optimizing efficiency of the asynchronous machine.

4. The method of claim 1, further comprising setting the flux as a function of load.

5. The method of claim 1, further comprising:
    calculating a change in the loss as a function of a change in the flux, and
    setting the flux as a function of the calculated loss.

6. The method of claim 1, further comprising:
    calculating the loss in a case of a current flux, the loss in a case of a reduced flux, and the loss in a case of an increased flux;
    determining a minimum of a curve or of a function based on the calculated losses; and
    setting the flux with minimal loss.

7. A device for determining a flux of an asynchronous machine comprising:
    a thermal model for calculating a loss of the asynchronous machine as a function of the flux of the asynchronous machine; and
    a selection facility for selecting the flux as a function of the calculated loss,
    wherein the device is configured to set the flux as a function of the loss using a non-linear saturation characteristic curve and either reducing the flux below 100% or increasing the flux above 100%.

8. The device of claim 7, further comprising an activation device for said device, said activation device activated as a function of load dynamics of the asynchronous machine.

9. The device of claim 7, wherein the device is integrated in a rectifier.

10. The device of claim 7, wherein the selection facility is configured to optimize efficiency of the asynchronous machine by the selection of the flux.

\* \* \* \* \*